(12) United States Patent
Ohashi et al.

(10) Patent No.: US 10,974,344 B2
(45) Date of Patent: Apr. 13, 2021

(54) FRICTION STIR SPOT JOINING APPARATUS AND FRICTION STIR SPOT JOINING METHOD

(71) Applicant: KAWASAKI JUKOGYO KABUSHIKI KAISHA, Kobe (JP)

(72) Inventors: Ryoji Ohashi, Kobe (JP); Yoshitaka Muramatsu, Akashi (JP); Masahiro Miyake, Kobe (JP); Takuya Fukuda, Kakogawa (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 231 days.

(21) Appl. No.: 15/770,221

(22) PCT Filed: Oct. 14, 2016

(86) PCT No.: PCT/JP2016/004589
§ 371 (c)(1),
(2) Date: Apr. 23, 2018

(87) PCT Pub. No.: WO2017/068767
PCT Pub. Date: Apr. 27, 2017

(65) Prior Publication Data
US 2018/0297145 A1  Oct. 18, 2018

(30) Foreign Application Priority Data
Oct. 21, 2015 (JP) .............................. JP2015-207353

(51) Int. Cl.
*B23K 20/12* (2006.01)
(52) U.S. Cl.
CPC ............ *B23K 20/127* (2013.01); *B23K 20/12* (2013.01); *B23K 20/123* (2013.01)

(58) Field of Classification Search
None
See application file for complete search history.

(56) References Cited

U.S. PATENT DOCUMENTS

| 6,050,475 A * | 4/2000 | Kinton | B23K 20/121 |
| | | | 144/142 |
| 6,421,578 B1 * | 7/2002 | Adams | B23K 20/123 |
| | | | 228/112.1 |

(Continued)

FOREIGN PATENT DOCUMENTS

| DE | 10 200 5032 170 A1 | 1/2007 | |
| EP | 2965858 A1 * | 1/2016 | ........... B23K 20/123 |

(Continued)

OTHER PUBLICATIONS

Aug. 2, 2019 Extended European Search Report issued in European Patent Application No. 16857090.1.

*Primary Examiner* — Devang R Patel
(74) *Attorney, Agent, or Firm* — Oliff PLC

(57) ABSTRACT

A friction stir spot joining apparatus includes a tool configured to be brought into contact with or separated from a surface of a second plate member on the opposite side to a first plate member of the first and second plate members that are overlaid on each other, a driving unit configured to rotationally drive the tool around its axis, a position adjusting unit configured to adjust a relative position between the tool and the second plate member, a control unit configured to control the driving unit and the position adjusting unit, and a breakage detection unit configured to detect breakage of the tool by controlling the control unit to dispose the tool at a contact position with the second plate member or a predetermined pushed position at one joining position.

7 Claims, 6 Drawing Sheets

(56) References Cited

U.S. PATENT DOCUMENTS

| | | | | |
|---|---|---|---|---|
| 7,455,210 B2* | 11/2008 | Nagao | ............... | B23K 20/123 228/112.1 |
| 2002/0158109 A1* | 10/2002 | Gendoh | ............... | B23K 20/123 228/112.1 |
| 2003/0029903 A1* | 2/2003 | Kashiki | ............... | B23K 20/123 228/112.1 |
| 2003/0201307 A1* | 10/2003 | Waldron | ............... | B23K 20/125 228/112.1 |
| 2006/0169740 A1* | 8/2006 | Fukuhara | ............... | B23K 20/125 228/2.1 |

FOREIGN PATENT DOCUMENTS

| | | |
|---|---|---|
| JP | S63-288647 A | 11/1988 |
| JP | 3471338 B2 | 12/2003 |
| JP | 2006-212657 A | 8/2006 |
| JP | 2010-188367 A | 9/2010 |

* cited by examiner

[Fig. 1]
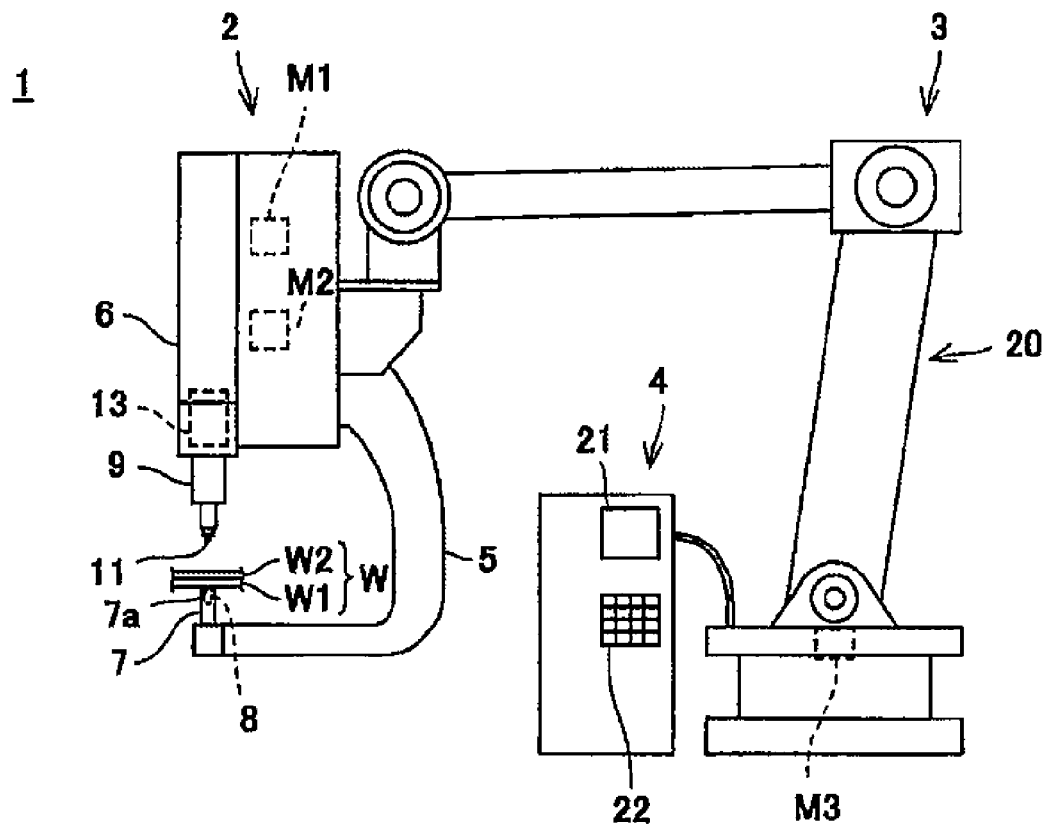
[Fig. 2]
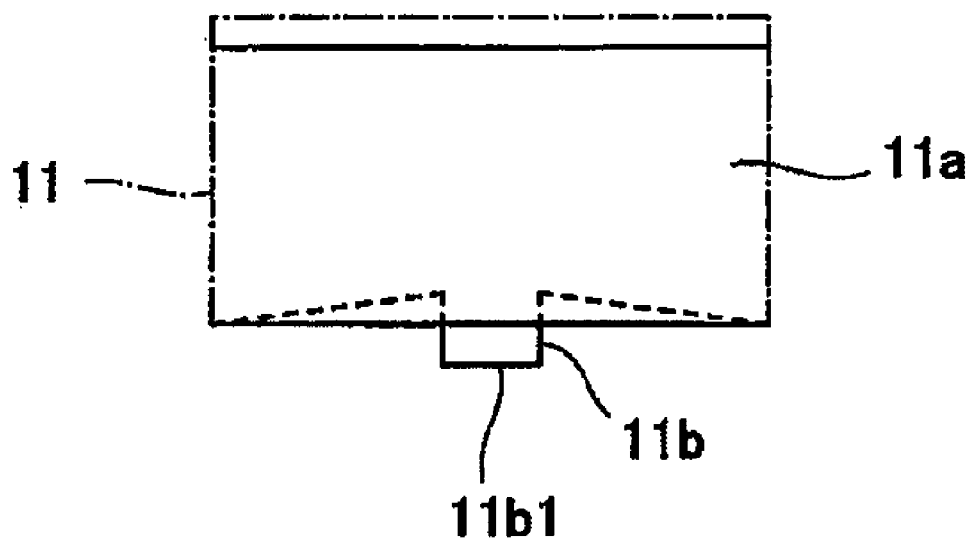

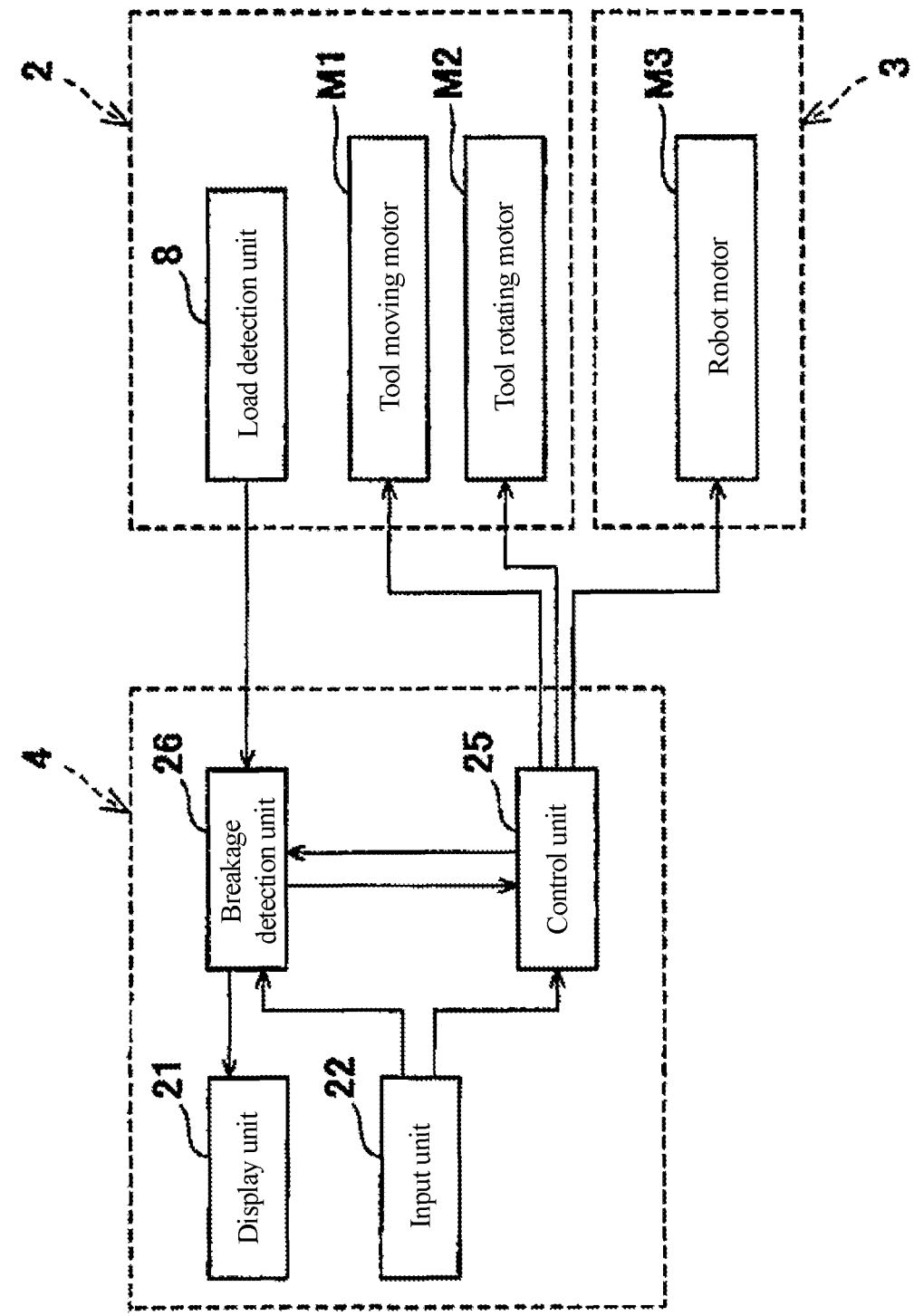
[Fig. 3]

[Fig. 4]
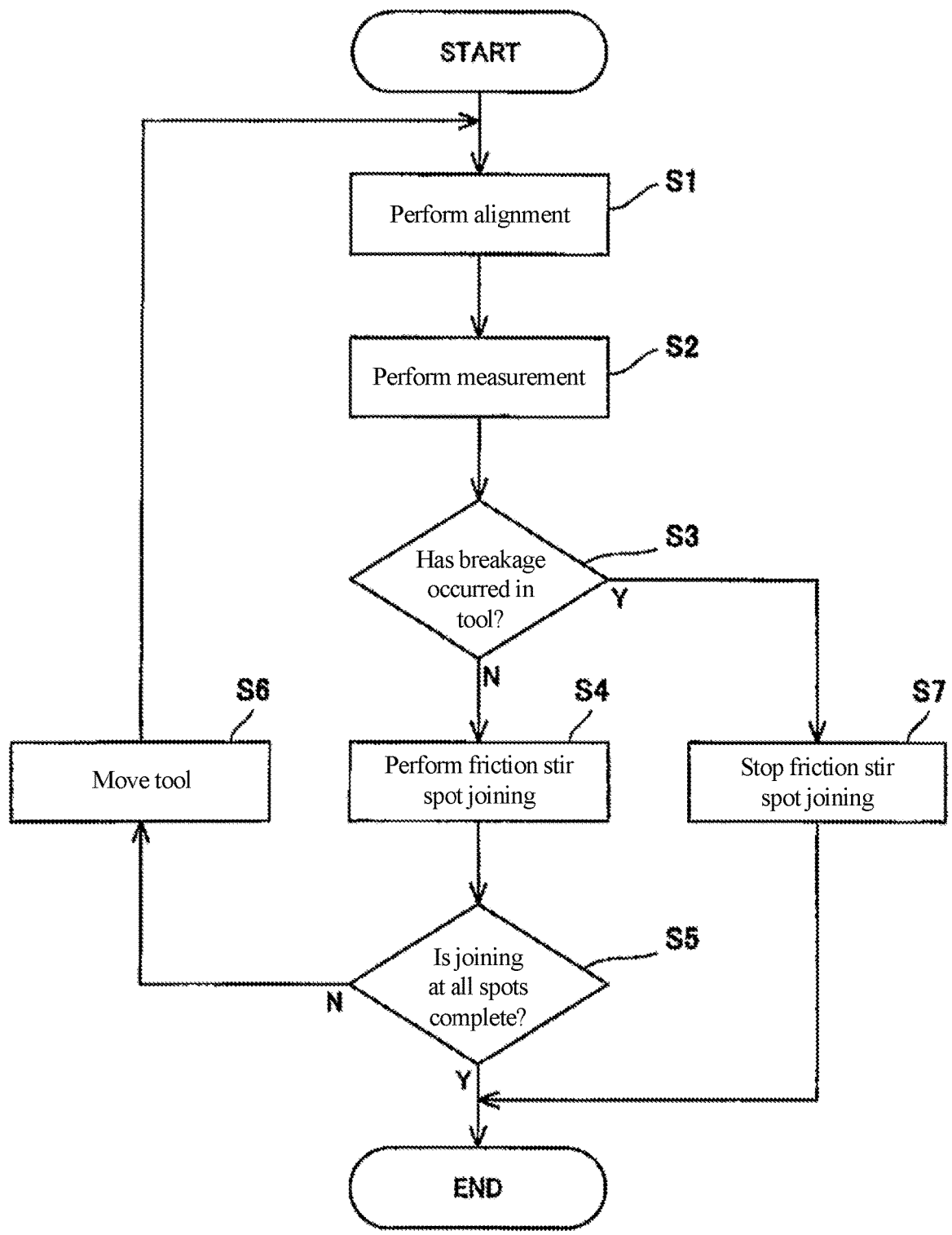

[Fig. 5]
(a) 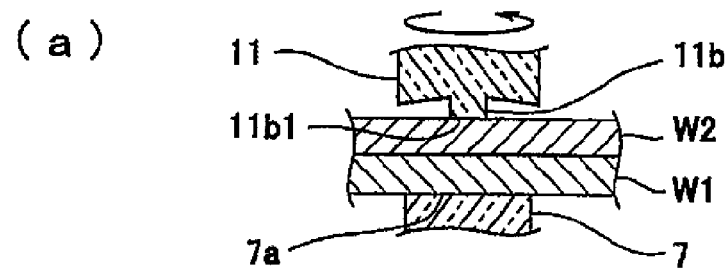
(b) 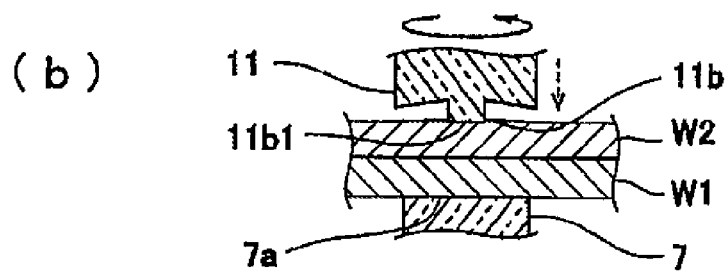
(c) 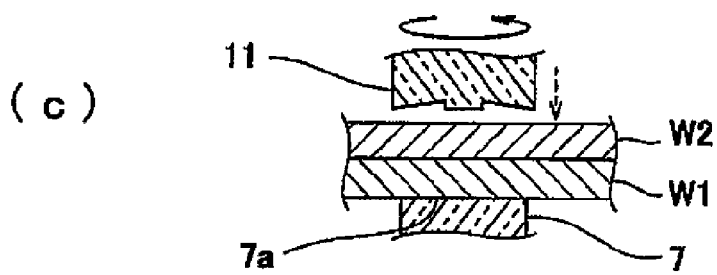
(d) 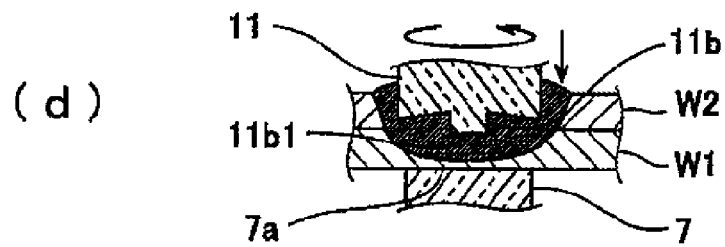

[Fig. 6]
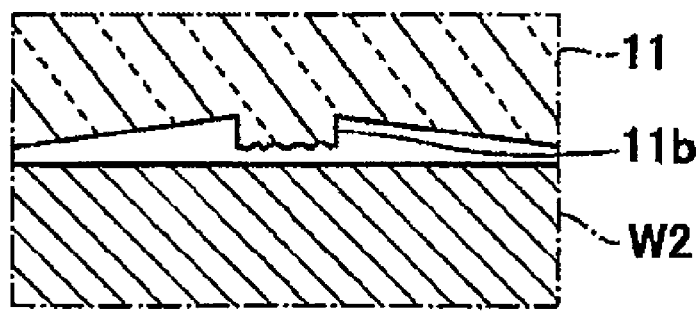
[Fig. 7]
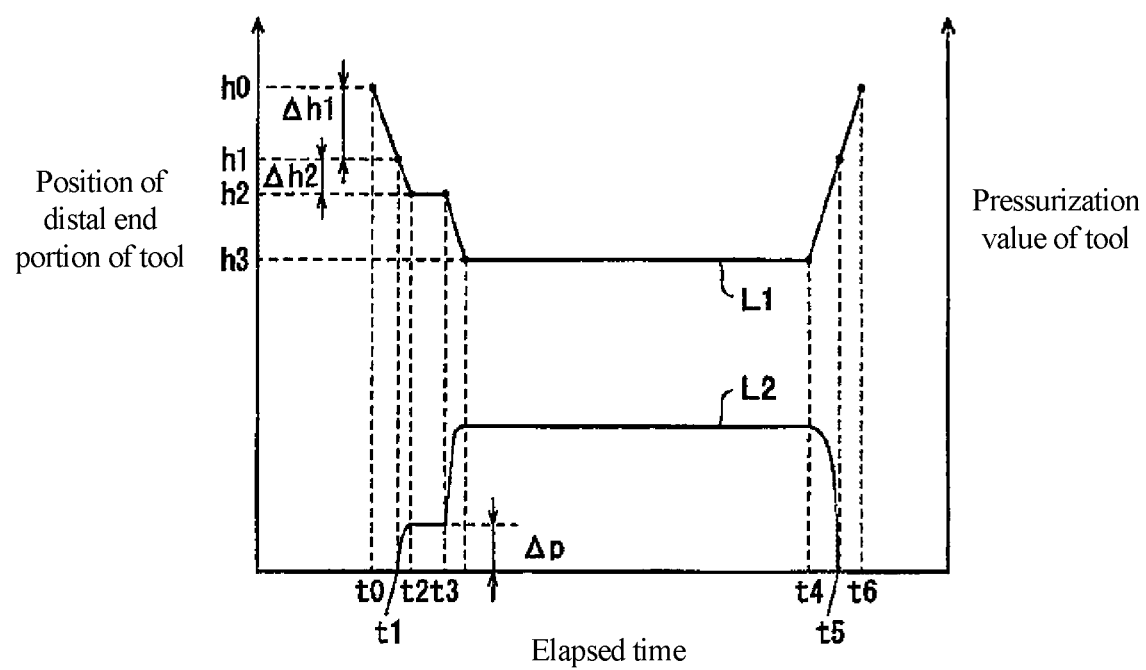

[Fig. 8]
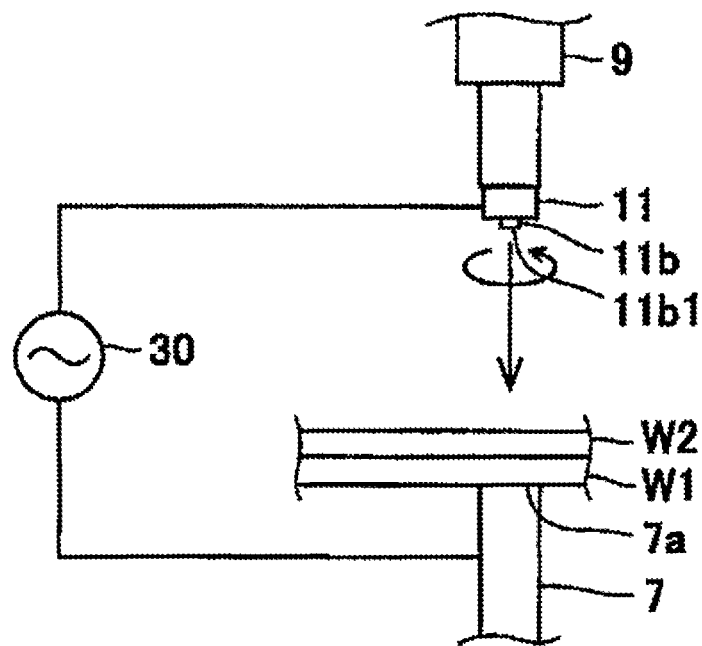
[Fig. 9]
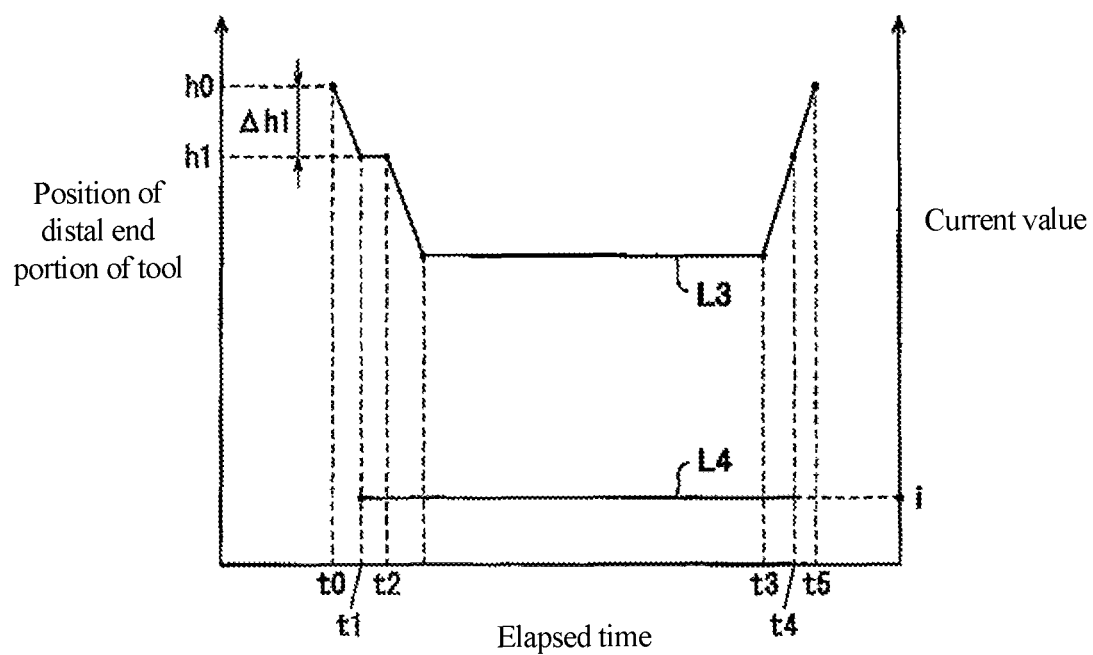

FRICTION STIR SPOT JOINING APPARATUS AND FRICTION STIR SPOT JOINING METHOD

TECHNICAL FIELD

The present invention relates to a friction stir spot joining apparatus and a friction stir spot joining method.

BACKGROUND ART

Conventionally, as a method of joining a pair of plate members to each other, a friction stir spot joining method (Friction Spot Joining) is known. In the case of joining a pair of plate members by this method, for example, as disclosed in PTL 1, a tool of a friction stir spot joining apparatus is pushed into a pair of overlaid plate members while being rotated, and is retracted after the joining is completed. As a result, the pair of plate members are joined by friction stir spot joining. In the case of continuously performing friction stir spot joining of a pair of plate members at a plurality of joining positions, the pair of plate members are joined by continuously performing a sequence including the operation of pushing the tool into the pair of plate members at one joining position and joining the pair of plate members by friction stir spot joining and the operation of retracting the tool from the pair of plate members after friction stir spot joining and moving the tool to another joining position.

CITATION LIST

Patent Literature

PTL 1: Japanese Patent No. 3471338

SUMMARY OF INVENTION

Technical Problem

When, for example, the tool is retracted after friction stir spot joining of a pair of plate members at one joining position in the process of continuously performing the above sequence, breakage sometimes occurs in the tool. If the breakage that has occurred after joining the pair of plate members at the preceding joining position by friction stir spot joining cannot be detected before friction stir spot joining at the next joining position, the broken tool may cause a joining failure or damage to the pair of plate members. In addition, there is a problem that the friction stir spot joining apparatus can be damaged by tool wobbling or a sudden increase in torque due to tool breakage.

It is therefore an object of the present invention to prevent a joining failure and damage on a pair of plate members and damage on a friction stir spot joining apparatus, when joining the pair of plate members at a plurality of joining positions by friction stir spot joining, by detecting breakage of a tool which has occurred after friction stir spot joining of the pair of plate members at a preceding joining position before friction stir spot joining at the next joining position.

Solution to Problem

In order to solve the above problems, there is provided a friction stir spot joining apparatus according to an aspect of the present invention which is a friction stir spot joining apparatus for continuously joining a first plate member and a second plate member that are overlaid on each other by friction stir spot joining at a plurality of joining positions, the apparatus including a tool configured to be brought into contact with or separated from a surface of the second plate member on the opposite side to the first plate member, a driving unit configured to rotationally drive the tool around its axis, a position adjusting unit configured to adjust the relative position between the tool and the second plate member, a control unit configured to control the driving unit and the position adjusting unit, and a breakage detection unit configured to detect breakage of the tool by controlling the control unit to dispose the tool at a contact position with the second plate member or a predetermined pushed position at one joining position of the plurality of joining positions.

According to the above configuration, because the breakage detection unit detects breakage of the tool by controlling the control unit so as to bring the tool into contact with the second plate member or dispose the tool at the predetermined pushed position at one joining position, breakage that has occurred in the tool can be detected before friction stir spot joining at the one joining position. Accordingly, when the first plate member and the second plate member are continuously joined by friction stir spot joining at a plurality of joining positions, breakage that has occurred in the tool after friction stir spot joining at the preceding joining position can be detected before friction stir spot joining at the next joining position.

The breakage detection unit may be configured to detect breakage of the tool based on the change amount of pressurization force with which the tool pressurizes the second plate member in the interval from when the distal end of the tool comes into contact with the second plate member to when the distal end of the tool is disposed at the predetermined pushed position.

In this manner, the breakage detection unit detects breakage of the tool by obtaining the change amount of pressurization force. This makes it possible to properly detect breakage of the tool even if the pressurization value of the tool deviates from the actual value. Therefore, for example, compared with a case where breakage of the tool is detected by obtaining the fixed value of pressurization force, the breakage detection accuracy of the tool by the breakage detection unit can be improved.

The apparatus further includes a load detection unit configured to receive the pressurization force from a surface of the first plate member on the opposite side to the second plate member. The breakage detection unit may calculate the change amount of the pressurization force based on an output signal from the load detection unit which is output upon reception of the pressurization force, compare the calculated change amount of the pressurization force with a predetermined threshold, and detect breakage of the tool by determining whether a predetermined change amount is obtained.

Accordingly, the breakage detection unit can appropriately calculate the change amount of the pressurization force based on the output signal from the load detection unit which is output upon receiving the pressurization force when the first plate member and the second plate member are pressurized by the tool, and determine whether the predetermined change amount is obtained by comparing the calculated change amount of pressurization force with the predetermined threshold. This makes it possible to properly detect breakage of the tool.

The breakage detection unit may be configured to detect breakage of the tool based on electric conduction when the distal end of the tool comes into contact with the second plate member.

This makes it possible to detect breakage in the tool by only bringing the tool into contact with the second plate member, and hence it is possible to properly prevent the second plate member from being pressurized and damaged by the broken tool.

When no breakage of the tool is detected by the breakage detection unit, the control unit may control the driving unit and the position adjusting unit so as to push the tool toward the second plate at the one joining position to join the first plate member and the second plate member by friction stir spot joining, and when breakage of the tool is detected by the breakage detection unit, the control unit may control at least one of the driving unit and the position adjusting unit to stop friction stir spot joining using the tool at the one joining position and remaining joining positions of the plurality of joining positions.

Because breakage of the tool can be detected at one joining position, when no breakage of the tool is detected, the first plate member and the second plate member can be quickly joined by friction stir spot joining at the one joining position.

The control unit may control the driving unit to cause the breakage detection unit to detect breakage of the tool while the tool is rotationally driven.

With this control, when no breakage of the tool is detected at each joining position, the first plate member and the second plate member can be quickly joined to each other by friction stir spot joining.

The breakage detection unit may detect breakage of the tool before friction stir spot joining at the one joining position.

Thus, when breakage of the tool is detected, it is possible to prevent the first plate member and the second plate member from being damaged by the broken tool at one joining position.

A friction stir spot joining method according to an aspect of the present invention is a friction stir spot joining method of continuously joining a first plate member and a second plate member that are overlaid on each other by friction stir spot joining at a plurality of joining positions using a friction stir spot joining apparatus, wherein the friction stir spot joining apparatus includes a tool configured to be brought into contact with and separated from a surface of the second plate member on the opposite side to the first plate member, and breakage of the tool is detected while the tool is brought into contact with the second plate or disposed at a predetermined pushed position at one joining position of the plurality of joining positions.

In this method, breakage of the tool may be detected before friction stir spot joining at the one joining position.

Advantageous Effects of Invention

According to present invention, it is possible to prevent a joining failure and damage on a pair of plate members and damage on a friction stir spot joining apparatus, when joining the pair of plate members at a plurality of joining positions by friction stir spot joining, by detecting breakage of a tool which has occurred after the joining of the pair of plate members at the preceding joining position by friction stir spot joining before friction stir spot joining at the next joining position.

BRIEF DESCRIPTION OF DRAWINGS

FIG. 1 is a side view of a friction stir spot joining apparatus according to an embodiment.

FIG. 2 is a side view of a tool.

FIG. 3 is a functional block diagram of the friction stir spot joining apparatus in FIG. 1.

FIG. 4 is an operation flowchart of the friction stir spot joining apparatus in FIG. 1.

FIGS. 5(*a*) to 5(*d*) are sectional views for describing each process in friction stir spot joining using the friction stir spot joining apparatus in FIG. 1.

FIG. 6 is a sectional view of a broken tool.

FIG. 7 is a graph showing changes in the position of a distal end portion of the tool in the friction stir spot joining apparatus in FIG. 1 and changes in the pressurization value of the tool detected by a load detection unit.

FIG. 8 is a partial side view of a friction stir spot joining apparatus according to a modification.

FIG. 9 is a graph showing changes in the position of a distal end portion of a tool in the friction stir spot joining apparatus in FIG. 8 and changes in the current value detected by a breakage detection unit.

DESCRIPTION OF EMBODIMENTS

Embodiment

An embodiment will be described below with reference to the accompanying drawings.

FIG. 1 is a side view of a friction stir spot joining apparatus 1 (hereinafter simply referred to as the joining apparatus 1) according to the embodiment. FIG. 2 is a side view of a tool 11. FIG. 3 is a functional block diagram of the joining apparatus 1 in FIG. 1. As shown in FIG. 1, a component W spot-joined by the joining apparatus 1 include a first plate member W1 and a second plate member W2 externally overlaid on the first plate member W1. The joining apparatus 1 continuously spot-joins the overlaid plate members W1 and W2 at a plurality of joining positions by friction stir spot joining. The joining apparatus 1 includes a joining unit 2, a multijoint robot 3, and a controller 4.

The joining unit 2 includes a frame portion 5, a unit main body 6, a lining portion 7, and a load detection unit 8. The frame portion 5 has a C-shaped or inverted C-shaped appearance in side view, supports the unit main body 6 and the lining portion 7, and is supported by the multijoint robot 3. The appearance shape of the frame portion 5 in side view is not particularly limited, and may be, for example, I-shaped.

The unit main body 6 includes a rotating shaft portion 9, a friction stir spot joining tool 11 (hereinafter simply referred to as the tool 11), a tool moving (lifting) motor M1, a tool rotating motor M2, a joining unit control unit 12, and a moving mechanism 13. The rotating shaft portion 9 extends from the housing of the unit main body 6 toward the lining portion 7 and is provided so as to be able to approach or separate from the lining portion 7 using the moving mechanism 13. A holder is provided at one end of the rotating shaft portion 9 which is positioned distant from the moving mechanism 13 in the axial direction and detachably holds the tool 11.

As shown in FIG. 2, the tool 11 is provided so as to be able to come into contact with or separate from the surface of the second plate member W2 on the opposite side to the first plate member W1. The tool 11 has a tool main body 11*a* and a protruding portion 11*b*. The protruding portion 11*b* is formed in a pin shape protruding from the tool main body 11*a* toward the lining portion 7.

The joining apparatus 1 includes a tool moving motor M1 as a driving unit for driving the moving mechanism 13 so as to make the tool 11 approach or separate from the lining portion 7 and a tool rotating motor M2 as a driving unit for rotationally driving the tool 11 about its axis. The tool moving motor M1 and the tool rotating motor M2 are provided in the housing of the unit main body 6 together with the moving mechanism 13. When the tool moving motor M1 is driven, the moving mechanism 13 is driven to move the rotating shaft portion 9 and the tool 11 toward or away from the lining portion 7 in the axial direction of the rotating shaft portion 9. Further, when the tool rotating motor M2 is driven, the rotating shaft portion 9 and the tool 11 are rotationally driven around the axis of the rotating shaft portion 9. The controller 4 controls the driving of each of the tool moving motor M1 and the tool rotating motor M2.

The lining portion 7 is disposed so as to face a distal end portion $11b1$ of the tool 11 through the plate members W1 and W2 and has, for example, a cylindrical outer appearance shape extending from the frame portion 5 toward the unit main body 6, and supports the first plate member W1 from below. A distal end portion $7a$ at one end of the lining portion 7 in the axial direction comes into contact with the surface of the first plate member W1 on the opposite side to the second plate member W2. The outer appearance of the lining portion 7 is not limited, and may be, for example, a rectangular parallelepiped shape.

The load detection unit 8 is provided in the lining portion 7. The load detection unit 8 is, for example, a load sensor, and is a load cell in this case. The load detection unit 8 detects the pressurization force of the tool 11 received through the plate members W1 and W2. An output signal from the load detection unit 8 is transmitted to a breakage detection unit 26 of the controller 4 (see FIG. 3).

The multijoint robot 3 has a robot motor M3, and moves the joining unit 2 to a predetermined position. The controller 4 controls the driving of the robot motor M3. The robot motor M3 may include a plurality of motors. The joining apparatus 1 includes the moving mechanism 13, the tool moving motor M1, and the robot motor M3 as a position adjusting unit 20 that adjusts the relative position between the tool 11 and the second plate member W2.

As shown in FIGS. 1 and 3, the controller 4 is a computer including a CPU, a ROM, and a RAM, and controls each operation of the joining unit 2 and the multijoint robot 3. The controller 4 includes a display unit 21, an input unit 22, a control unit 25, and the breakage detection unit 26. The display unit 21 is, for example, a liquid crystal display, and displays predetermined information to an operator. The input unit 22 receives information input by the operator. A predetermined control program is stored in the ROM, and the RAM is configured to store setting information input via the input unit 22. The setting information includes, for example, information on each plate thickness value of the plate members W1 and W2 and information on each joining position.

The control unit 25 controls each of the motors M1 to M3 based on the control program. The breakage detection unit 26 receives an output signal from the load detection unit 8 and controls the control unit 25 based on the control program. The breakage detection unit 26 detects breakage of the tool 11 (in this case, breakage that reduces the protrusion size of the protruding portion $11b$). As described above, the joining apparatus 1 includes the breakage detection unit 26 for detecting breakage of the tool 11. As will be described later, the breakage detection unit 26 is configured to detect breakage of the tool 11 based on a change amount $\Delta p$ of pressurization force with which the tool 11 pressurizes the second plate member W2 in the interval between when the distal end (the distal end portion $11b1$) of the tool 11 and the second plate member W2 come into contact with each other and when the distal end of the tool 11 is disposed at a predetermined pushed position.

Next, a method of continuously joining the overlaid plate members W1 and W2 at a plurality of joining positions by friction stir spot joining using the joining apparatus 1 will be exemplified. In this method, the joining apparatus 1 continuously performs a sequence including the operation of pushing the tool 11 into the plate members W1 and W2 at one joining position while rotating the tool 11 and joining the plate members W1 and W2 by friction stir spot joining and the operation of retracting the tool 11 from the plate members W1 and W2 after friction stir spot joining and moving the tool 11 to another joining position. As a result, the plate members W1 and W2 are continuously joined at a plurality of joining positions by friction stir spot joining.

FIG. 4 is an operation flowchart of the joining apparatus 1 in FIG. 1. As shown in FIG. 4, the joining apparatus 1 performs alignment step S1 and measurement step S2 in this order, and then performs determination step S3 of determining breakage of the tool 11. In accordance with this determination result, the joining apparatus 1 performs friction stir spot joining step (hereinafter referred to as joining step) S4 or notification step S7. When no breakage of the tool 11 is detected in determination step S3, joining step S4 and completion determination step S5 are performed in this order. If there is any remaining joining position, tool moving step S6 is performed.

FIGS. 5($a$) to 5($d$) are sectional views for describing each process in friction stir spot joining using the joining apparatus 1 in FIG. 1. FIG. 6 is a sectional view of the broken tool 11. FIG. 7 is a graph showing changes in the position of the distal end portion $11b1$ of the tool 11 in the joining apparatus 1 in FIG. 1 and changes in the pressurization value of the tool 11 detected by the load detection unit 8. Referring to FIG. 7, a curve L1 indicates changes in the position of the distal end portion $11b1$ at the one joining position, and a curve L2 indicates changes in the pressurization value of the tool 11 detected by the load detection unit 8 at the one joining position.

As shown in FIG. 7, the operation time of the tool 11 at the one joining position is chronologically divided into an approaching movement section (the interval between times t0 and t1) in which the tool 11 is moved toward the second plate member W2, a detection section (the interval between times t1 and t3) in which breakage of the tool 11 is detected, a joining section (the interval between times t3 and t4) in which the plate members W1 and W2 are joined by the tool 11 by friction stir spot joining, and a separating movement section (the interval between times t4 and t6) in which the tool 11 is separated from the plate members W1 and W2 joined by friction stir spot joining. Further, the detection section is divided into a measurement section (the interval between times t1 and t2) in which the pressurization force of the tool 11 is measured and a determination section (the interval between times t2 and t3) in which it is determined whether breakage has occurred in the tool 11.

First, the operator inputs the setting information to the joining apparatus 1 via the input unit 22, and makes a predetermined jig hold the plate members W1 and W2 in an overlaid state. The breakage detection unit 26 causes the control unit 25 to control the position adjusting unit 20 so as to move the joining unit 2 to the one joining position. At this time, the control unit 25 controls the position adjusting unit 20 so as to respectively arrange the tool 11 and the lining portion 7 on the second plate member W2 side and the first plate member W1 side and support the first plate member W1 on the distal end portion 7a of the lining portion 7. With this control, the joining apparatus 1 is aligned with the plate members W1 and W2, thus performing alignment step S1.

As indicated by a curve L1 in FIG. 7, the breakage detection unit 26 causes the control unit 25 to control the tool rotating motor M2 so as to rotationally drive the tool 11 in the approaching movement section, and causes the control unit 25 to control the position adjusting unit 20 so as to move the tool 11 toward the second plate member W2 by a movement amount Δh1. At this time, when no breakage has occurred in the tool 11, the distal end portion 11b1 is moved from a reference (zeroing) position h0 to a first position h1 and brought into contact with the surface of the second plate member W2 on the opposite side to the first plate member W1 (FIG. 5(a)).

As indicated by the curve L1 in FIG. 7, the breakage detection unit 26 causes the control unit 25 to control the tool rotating motor M2 so as to continuously rotationally drive the tool 11 in the measurement section. Further, the breakage detection unit 26 causes the control unit 25 to control the position adjusting unit 20 so as to move the distal end portion 11b1 toward the second plate member W2 by a movement amount Δh2. At this time, the distal end portion 11b1 is moved from the first position h1 to a second position h2 closer toward the second plate member W2 than the first position h1, and the protruding portion 11b is slightly pushed into the second plate member W2 (FIG. 5(b)). With this operation, the breakage detection unit 26 controls the control unit 25 so as to bring the tool 11 into contact with the second plate member W2 or dispose the tool 11 at a predetermined pushed position. At this time, the value of the pushing amount of the protruding portion 11b in the plate thickness direction of the second plate member W2 can be set as necessary. For example, this value preferably falls within the range of 0.1 mm to 0.5 mm inclusive, more preferably the range of 0.2 mm to 0.4 mm inclusive. In this case, the value of the pushing amount of the protruding portion 11b in the plate thickness direction of the second plate member W2 is set to 0.3 mm.

When no breakage has occurred in the tool 11, the protruding portion 11b is pushed into the second plate member W2 as the distal end portion 11b1 is moved toward the second plate member W2 by the movement amount Δh2. As a consequence, the pressurization force of the tool 11 is transferred to the load detection unit 8 via the plate members W1 and W2, and the load detection unit 8 outputs the pressurization force of the tool 11 as an output signal in a time-series manner. As indicated by the curve L2 in FIG. 7, the breakage detection unit 26 measures the pressurization value of the tool 11 with respect to the plate members W1 and W2 based on the output signal from the load detection unit 8, and calculates the change amount Δp of pressurization force before and after the distal end portion 11b1 is moved toward the second plate member W2 by the movement amount Δh2. In this manner, measurement step S2 is performed.

In this case, as shown in FIGS. 5(c) and 6, in a case where the distal end portion 11b1 is moved toward the second plate member W2 by the movement amount Δh2, when breakage has occurred in the tool 11 to such an extent that the protruding portion 11b does not come into contact with the second plate member W2, the change amount Δp of pressurization force is zero. In addition, in a case where the distal end portion 11b1 is moved toward the second plate member W2 by the movement amount Δh2, when breakage has occurred in the tool 11 to such an extent that the protruding portion 11b can come into contact with the second plate member W2, the pressurization force of the tool 11 with respect to the plate members W1 and W2 decreases, as compared with the case where no breakage has occurred in the tool 11, and hence the change amount Δp of pressurization force decreases.

In measurement step S2, in a state in which the breakage detection unit 26 causes the control unit 25 to control the position adjusting unit 20 so as to move the tool 11 toward the second plate member at the one joining position, the breakage detection unit 26 determines whether breakage has occurred in the tool 11 by determining whether predetermined physical information is obtained by controlling the control unit 25 to place the protruding portion 11b at a contact position with the second plate member W2 or at a predetermined pushed position. In this case, in the determination section, the breakage detection unit 26 causes the control unit 25 to control the tool rotating motor M2 so as to continuously rotationally drive the tool 11, and also causes the control unit 25 to control the position adjusting unit 20 so as to maintain the position of the distal end portion 11b1 at the second position h2. In this state, the breakage detection unit 26 compares the change amount Δp of pressurization force with a predetermined threshold Δp0, and determines whether the change amount Δp of pressurization force equal to or larger than the threshold Δp0 is obtained as the physical information, thereby determining whether breakage has occurred in the tool 11. Upon determining that the change amount Δp of pressurization force equal to or larger than the threshold Δp0 is obtained, the breakage detection unit 26 determines that no breakage has occurred in the tool 11. Otherwise, the breakage detection unit 26 determines that breakage has occurred in the tool 11. In this manner, determination step S3 is performed. As described above, the breakage detection unit 26 is configured to detect breakage of the tool 11 by obtaining the above physical information.

Accordingly, for example, even if breakage occurs in the tool 11 at the timing of retracting the tool 11 from the plate members W1 and W2 after friction stir spot joining at the preceding joining position, the breakage of the tool 11 is detected before friction stir spot joining of the plate members W1 and W2 at the next joining position.

Although the time period of a detection section can be set as necessary, it is desirable that the time period is sufficiently shorter than the time period of a joining section in order to shorten the time period of a series of operations required for friction stir spot joining at a plurality of joining positions. As an example, the time period of the detection section is preferably in the range of 0.05 sec to 1 sec inclusive, more preferably the range of 0.1 sec to 0.5 sec inclusive, further more preferably the range of 0.15 sec to 0.3 sec inclusive. In this case, the time period of the detection section is set to 0.2 sec.

Upon determining in determination step S3 that the physical information is not obtained (breakage has occurred in the tool 11), the breakage detection unit 26 causes the control unit 25 to control at least one of the tool rotating motor M2 and the position adjusting unit 20 so as to stop friction stir spot joining using the tool 11 at the one joining position and the remaining joining positions of a plurality of joining positions of the plate members W1 and W2. In this case, the breakage detection unit 26 causes the control unit 25 to control the tool rotating motor M2 so as to stop rotationally driving the tool 11, and also causes the control unit 25 to control the position adjusting unit 20 so as to return the position of the distal end portion 11b1 of the protruding portion 11b from the second position h2 to at least the reference position h0. In addition, the breakage detection unit 26 displays, on the display unit 21, information indicating that friction stir spot joining has been stopped, and notifies the operator of the corresponding information. In this manner, notification step S7 is performed. Note that the breakage detection unit 26 may notify the operator that friction stir spot joining is stopped by issuing an alarm sound without using the display unit 21.

Upon determining in determination step S3 that the physical information is obtained (no breakage has occurred in the tool 11), the breakage detection unit 26 causes the control unit 25 to control the tool rotating motor M2 and the position adjusting unit 20 so as to perform friction stir spot joining of the plate members W1 and W2 by pushing the tool 11 toward the second plate member while keeping the protruding portion 11b in contact with the second plate member W2 at the one joining position. More specifically, in the joining section, the breakage detection unit 26 causes the control unit 25 to control the position adjusting unit 20 so as to push the tool 11 toward the second plate member W2 while keeping the tool 11 in contact with the second plate member W2 at the one joining position in a state of causing the control unit 25 to control the tool rotating motor M2 so as to continuously rotationally drive the tool 11 (see FIG. 7). At this time, the control unit 25 controls the position adjusting unit 20 to move the distal end portion 11b1 from the second position h2 to a third position h3 closer toward the second plate member W2 than the second position h2 and further push the protruding portion 11b into the second plate member W2. That is, as indicated by the curve L2 in FIG. 7, the control unit 25 controls the position adjusting unit 20 to pressurize the plate members W1 and W2 with a pressurization value larger than the maximum pressurization value with which the plate members W1 and W2 are pressurized by the tool 11 in the measurement section. When the rotationally driven tool 11 is pushed toward the second plate member W2 and the protruding portion 11b is pushed into the plate members W1 and W2, the plate members W1 and W2 are joined by friction stir spot joining at the one joining position (FIG. 5(d)). In this manner, joining step S4 is performed.

After the friction stir spot joining, while causing the control unit 25 to control the tool rotation motor M2 so as to continuously rotationally drive the tool 11 in a separation movement section, the breakage detection unit 26 causes the control unit 25 to control the position adjusting unit 20 so as to retract the tool 11 from the plate members W1 and W2 by returning the position of the distal end portion 11b1 from the third position h3 to the first position h1 in the interval from time t4 to time t5 and to return the position of the distal end portion 11b1 from the first position h1 to the reference position h0 in the interval from time t5 to time t6. The rotation speed of the tool 11 in each of steps S2 to S4 is set to the same value, but the rotation speed of the tool 11 in measurement step S2 and determination step S3 may differ from the rotation speed of the tool 11 in joining step S4. For example, the rotation speed of the tool 11 in joining step S4 may be set to be larger than that of the tool 11 in measurement step S2 and determination step S3.

After the completion of joining step S4, the breakage detection unit 26 performs completion determining step S5 of determining whether joining step S4 at all joining positions has been completed. Upon determining that joining step S4 for the plate members W1 and W2 at all the joining positions has not been completed, the breakage detection unit 26 causes the control unit 25 to control the position adjusting unit 20 to move the tool 11 to the next joining position. Upon determining in completion determination step S5 that joining step S4 for the plate members W1 and W2 at all the joining positions has been completed, the breakage detection unit 26 terminates the operation procedure.

As described above, according to the joining apparatus 1, it is determined whether breakage has occurred in the tool 11 at one joining position. Accordingly, for example, there is no need to move the tool 11 to the joining position of the plate members W1 and W2 after the tool 11 is moved to a predetermined position and it is determined whether breakage has occurred in the tool 11 upon pressurization of a test piece with the tool 11.

Further, the breakage detection unit 26 causes the control unit 25 to control the tool rotating motor M2 so as to detect breakage of the tool 11 while the tool 11 is rotationally driven. Accordingly, when no breakage is detected in the tool 11, it is possible to quickly join the plate members W1 and W2 by friction stir spot joining at each joining position.

Further, because the breakage detection unit 26 detects breakage of the tool 11 before friction stir spot joining at one joining position, when breakage of the tool 11 is detected, the breakage detection unit 26 can prevent the plate members W1 and W2 from being damaged by the broken tool 11.

In this case, when the tool breaks in the conventional joining apparatus, the protruding portion of the tool often breaks so as to remain inside the plate member when the tool is retracted from the plate member. In the joining apparatus, the tool is retracted from the plate member immediately after friction stir spot joining is performed at one joining position. Accordingly, even if torque due to the rotating shaft current of the tool rotating motor and the position of the tool change due to breakage of the tool, it is difficult to detect such change. In some case, therefore, breakage of the tool cannot be detected. Conventionally, even in such a case, a joining operation is performed at the next joining position while the tool is broken, and accordingly, there is a possibility of damaging the joining apparatus and the plate member.

Accordingly, as in this embodiment, a method of detecting breakage that has occurred in the tool after friction stir spot joining at the preceding joining position before friction stir spot joining at the next joining position is very effective in preventing damage on the joining apparatus and plate members.

If the setting of a zero point position in an output signal from the load detection unit 8 is shifted or the positions of the plate members W1 and W2 with respect to the lining portion 7 are shifted before the breakage detection unit 26 performs determination, the load detection unit 8 may output an output signal regardless of the pressurization force of the tool 11. On the other hand, in the joining apparatus 1, the change amount $\Delta p$ of pressurization force is used as the physical information used for determination by the breakage detection unit 26, and accordingly, even if, for example, the measured pressurization value of the tool 11 deviates from the actual value, the breakage detection unit 26 can properly detect breakage of the tool 11. Therefore, as compared with a case where breakage of the tool 11 is detected by obtaining the fixed value of a pressurization force, it is possible to improve the accuracy of detection of breakage of the tool 11 by the breakage detection unit 26.

In the method of detecting breakage of the tool by comparing the position of the distal end of the tool at the time of measurement of a predetermined pressurization value based on an output signal from the load detection unit with a predetermined reference position of the distal end of the tool, a fluctuation in the hardness of the first plate member W1 or the second plate member W2 between a plurality of joining positions may cause an erroneous decision. In contrast, in the joining apparatus 1, the breakage detection unit 26 causes the distal end portion 11b1 of the protruding portion 11b of the tool 11 to stay at a predetermined position (the second position h2), and determines whether breakage has occurred in the tool 11 by determining whether the change amount Δp of pressurization force is obtained depending on the contact of the protruding portion 11b with the second plate member W2. This makes it possible to prevent such an erroneous decision.

Further, even in a case where the first plate member W1 is deformed and the first plate member W1 is separated from the distal end portion 7a of the lining portion 7, when the plate members W1 and W2 are pressurized by the tool 11, the first plate member W1 comes into contact with the distal end portion 7a of the lining portion 7. Accordingly, the breakage detection unit 26 can calculate the change amount Δp of pressurization force. Therefore, the breakage detection unit 26 can appropriately determine whether breakage has occurred in the tool 11.

The breakage detection unit 26 calculates the change amount Δp of pressurization force based on an output signal from the load detection unit 8 which receives the pressurization force of the tool 11 from the surface of the first plate member W1 on the opposite side to the second plate member W2. By comparing the calculated change amount Δp of pressurization force with the threshold Δp0, the breakage detection unit 26 can appropriately determine whether the change amount Δp of pressurization force equal to or larger than the threshold Δp0 is obtained, thereby properly detecting breakage of the tool 11.

Note that in measurement step S2, while the tool 11 is rotationally driven, the breakage detection unit 26 may measure a current value necessary for rotating the rotating shaft of the tool moving motor M1 when moving the distal end portion 11b1 toward the second plate member W2 by the movement amount Δh2, and calculate the change amount ΔT of torque of the tool moving motor M1 as the change amount of pressurization force of the tool 11.

It is considered that the rotational resistance value of the tool rotating motor M2 at the second position h2 when breakage has occurred in the tool 11 is smaller than the rotational resistance of the tool rotating motor M2 at the second position h2 when no breakage has occurred in the tool 11. Accordingly, in measurement step S2, when the distal end portion 11b1 is moved toward the second plate member W2 by the movement amount Δh2 while the tool 11 is rotationally driven, the breakage detection unit 26 calculates the change amount ΔT of torque by measuring a current value necessary for rotating the rotating shaft of the tool rotating motor M2. In determination step S3, the breakage detection unit 26 compares the change amount ΔT of torque with a predetermined threshold ΔT0. Upon determining that the change amount ΔT of torque is equal to or larger than the threshold ΔT0, the breakage detection unit 26 can determine that no breakage has occurred in the tool 11; otherwise, the breakage detection unit 26 can determine that breakage has occurred in the tool 11.

The load detection unit 8 is not limited to a load sensor, and may be a strain gauge. In this case, a strain gauge can be attached to the outside or inside of the frame portion 5 so as to detect strain occurring in the frame portion 5 when the plate members W1 and W2 are pressurized by the tool 11. The breakage detection unit 26 can calculate the change amount Δp of pressurization force based on the output signal output from the strain gauge.

In determination step S3, the breakage detection unit 26 may compare the maximum pressurization value $F_{max}$ of the tool 11 measured, in the measurement step S2, by an output signal from the load detection unit 8 while the distal end portion 11b1 is moved toward the second plate member W2 by at least one of the movement amount Δh1 and the movement amount Δh2 with a predetermined threshold ΔF0. In this case, in determination step S3, the breakage detection unit 26 can determine that no breakage has occurred in the tool 11 if, for example, it is determined that the maximum pressurization value $F_{max}$ equal to or larger than the threshold ΔF0 is obtained; otherwise, the breakage detection unit 26 can determine that breakage has occurred in the tool 11.

Modification

A modification will be mainly described with reference to the drawings, focusing on differences from the embodiment.

FIG. 8 is a partial side view of a joining apparatus 101 according to the modification. FIG. 9 is a graph showing changes in the position of the distal end portion 11b1 of the tool 11 in the joining apparatus 101 in FIG. 8 and changes in the current value detected by the breakage detection unit 26. Referring to FIG. 9, a curve L3 indicates changes in the position of the distal end portion 11b1, and a curve L4 indicates changes in the current value detected by the breakage detection unit 26.

In this modification, the breakage detection unit 26 is configured to detect breakage of the tool 11 based on electric conduction when the distal end (the distal end portion 11b1) of the tool 11 comes into contact with the second plate member W2. In other words, the breakage detection unit 26 is configured to detect breakage of the tool 11 by obtaining, as the above physical information, electric conduction when the distal end of the tool 11 comes into contact with the second plate member W2.

The operation time of the tool 11 at the one joining position is chronologically divided into an approaching movement section between times t0 and t1, a detection section between times t1 and t2, a joining section between times t2 and t3, and a separating movement section between times t3 and t5.

Both the tool 11 and the lining portion 7 have conductivity. As shown in FIG. 8, both the tool 11 and the lining portion 7 are connected to a power supply 30. The power supply 30 is, for example, an AC power supply, but may be a DC power supply. In the joining apparatus 101, the state of electric conduction or non-electric conduction between the tool 11 and the lining portion 7 via the plate members W1 and W2 is monitored by the breakage detection unit 26. In this case, the breakage detection unit 26 also functions as a current detection device that detects a current flowing between the tool 11 and the lining portion 7 via the plate members W1 and W2.

As indicated by the curve L3 in FIG. 9, the breakage detection unit 26 causes the control unit 25 to control the tool rotating motor M2 so as to rotationally drive the tool 11 in the movement section, and causes the control unit 25 to control the position adjusting unit 20 so as to move the distal end portion 11b1 toward the second plate member W2 by a movement amount Δh1. When the distal end portion 11b1 is moved from the reference position h0 to the first position h1 and no breakage has occurred in the tool 11, the distal end portion 11b1 comes into contact with the surface of the second plate member W2 on the opposite side to the first plate member W1.

As shown by the curve L4 in FIG. 9, in the detection section, the breakage detection unit 26 measures a value i of a current flowing between the tool 11 and the lining portion 7 via the plate members W1 and W2. In this manner, measurement step S2 is performed. In addition, in the detection section, the breakage detection unit 26 determines whether breakage has occurred in the tool 11 by determining whether the current value i measured in measurement step S2 is a predetermined current value i0. In this manner, determination step S3 is performed. Upon determining that the current value i is the predetermined current value i0, the breakage detection unit 26 determines that no breakage has occurred in the tool 11; otherwise, the breakage detection unit 26 determines that breakage has occurred in the tool 11. The current value i0 can be set as necessary. For example, when no breakage has occurred in the tool 11, the current value i0 is preferably sufficiently smaller than the current value i flowing between the tool 11 and the lining portion 7 via the plate members W1 and W2. In this case, the current value i0 is set to 0 mA.

As described above, in the joining apparatus 101, because breakage of the tool 11 can be detected only by bringing the tool 11 into contact with the second plate member W2, it is possible to properly prevent the second plate member W2 from being pressurized and damaged by the broken tool 11.

The present invention is not limited to the above-described embodiment and modification, and the configuration or method thereof can be changed, added, or deleted without departing from the spirit of the present invention. The structure manufactured by friction stir spot joining may be a part or body other than a door part of a car, or a structure other than a car (for example, a part or a body of an aircraft).

REFERENCE SIGNS LIST $\Delta p$ change amount of pressurization force
$\Delta p0$, $\Delta T0$, $\Delta F0$ threshold
M2 tool rotating motor (driving unit)
W1 first plate member
W2 second plate member
1, 101 joining apparatus
8 load detection unit
11 tool
20 position adjusting unit
25 control unit
26 breakage detection unit

The invention claimed is:

1. A friction stir spot joining apparatus for continuously joining a first plate member and a second plate member that are overlaid on each other by friction stir spot joining at a plurality of joining positions, the apparatus comprising:
a tool configured to be brought into contact with or separated from a surface of the second plate member on an opposite side to the first plate member;
a driving unit configured to rotationally drive the tool around an axis of the tool;
a position adjusting unit configured to adjust a relative position between the tool and the second plate member; and
a processor programed to
control the driving unit and the position adjusting unit; and
detect breakage of the tool by
controlling the driving unit and the position adjusting unit to dispose the tool at a contact position with the second plate member or a predetermined pushed position at one joining position of the plurality of joining positions;
calculating a change amount of pressurization force with which the tool pressurizes the second plate member in an interval from when a distal end of the tool comes into contact with the second plate member to when the distal end of the tool is disposed at the predetermined pushed position; and
comparing the calculated change amount of the pressurization force with a predetermined threshold, wherein
when the change amount of the pressurization force is not less than the threshold, the processor determines that there is no breakage of the tool; and
when the change amount of the pressurization force is less than the threshold, the processor determines that there is the breakage of the tool.

2. The friction stir spot joining apparatus according to claim 1, further comprising a load detection unit configured to receive the pressurization force from a surface of the first plate member on an opposite side to the second plate member, wherein
the processor is programed to calculate the change amount of the pressurization force based on an output signal from the load detection unit which is output upon reception of the pressurization force.

3. The friction stir spot joining apparatus according to claim 1, wherein the processor is programed to:
when no breakage of the tool is detected by the processor, control the driving unit and the position adjusting unit so as to push the tool toward the second plate at the one joining position to join the first plate member and the second plate member by friction stir spot joining; and
when the breakage of the tool is detected by the processor, control at least one of the driving unit and the position adjusting unit to stop friction stir spot joining using the tool at the one joining position and remaining joining positions of the plurality of joining positions.

4. The friction stir spot joining apparatus according to claim 1, wherein the processor is programed to control the driving unit and to detect the breakage of the tool while the tool is rotationally driven.

5. The friction stir spot joining apparatus according to claim 1, wherein the processor is programed to detect the breakage of the tool before friction stir spot joining at the one joining position.

6. A friction stir spot joining method of continuously joining a first plate member and a second plate member that are overlaid on each other by friction stir spot joining at a plurality of joining positions using a friction stir spot joining apparatus, the method comprising:
providing the friction stir spot joining apparatus, the friction stir spot joining apparatus including a tool configured to be brought into contact with and separated from a surface of the second plate member on an opposite side to the first plate member; and
detecting breakage of the tool while the tool is brought into contact with the second plate member or disposed at a predetermined pushed position at one joining position of the plurality of joining positions, wherein
the detecting of the breakage of the tool includes:
calculating a change amount of pressurization force with which the tool pressurizes the second plate member in an interval from when a distal end of the tool comes into contact with the second plate member to when the distal end of the tool is disposed at the predetermined pushed position;

comparing the calculated change amount of the pressurization force with a predetermined threshold;

when the change amount of the pressurization force is not less than the threshold, determining that there is no breakage of the tool; and when the change amount of the pressurization force is less than the threshold; determining that there is the breakage of the tool.

7. The friction stir spot joining method according to claim 6, wherein the breakage of the tool is detected before friction stir spot joining at the one joining position.

* * * * *